United States Patent
Gumpoltsberger

(10) Patent No.: US 7,288,044 B2
(45) Date of Patent: Oct. 30, 2007

(54) TRANSMISSION, IN PARTICULAR AN AUTOMATED POWER-BRANCHED MULTI-SPEED GEARING

(75) Inventor: Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 157 days.

(21) Appl. No.: 10/552,297

(22) PCT Filed: Mar. 27, 2004

(86) PCT No.: PCT/EP2004/003274

§ 371 (c)(1),
(2), (4) Date: Oct. 3, 2005

(87) PCT Pub. No.: WO2004/088174

PCT Pub. Date: Oct. 14, 2004

(65) Prior Publication Data

US 2006/0223666 A1    Oct. 5, 2006

(30) Foreign Application Priority Data

Apr. 4, 2003   (DE) ................................ 103 15 313

(51) Int. Cl.
*F16H 37/02* (2006.01)
(52) U.S. Cl. .................................................... 475/218
(58) Field of Classification Search ................ 475/209, 475/218
See application file for complete search history.

(56) References Cited

U.S. PATENT DOCUMENTS

| | | | |
|---|---|---|---|
| 4,046,031 A | 9/1977 | Ott et al. | |
| 5,013,289 A | 5/1991 | Van Maanen | |
| 5,520,587 A * | 5/1996 | Hall, III | 475/218 |
| 5,520,588 A * | 5/1996 | Hall, III | 475/218 |
| 5,567,201 A | 10/1996 | Ross | |
| 5,593,358 A * | 1/1997 | Frost | 475/218 |
| 5,971,883 A * | 10/1999 | Klemen | 475/296 |
| 7,128,681 B2 * | 10/2006 | Sugino et al. | 475/218 |
| 2003/0083174 A1 | 5/2003 | Tabata et al. | |
| 2004/0083837 A1 | 5/2004 | Gumpoltsberger et al. | |
| 2004/0198545 A1 * | 10/2004 | Gumpoltsberger et al. | 475/214 |

FOREIGN PATENT DOCUMENTS

| | | |
|---|---|---|
| DE | 101 45 519 A1 | 4/2003 |
| DE | 102 50 374 A1 | 6/2003 |
| DE | 102 50 480 A1 | 5/2004 |
| DE | 102 60 179 A1 | 7/2004 |
| EP | 0 517 604 A1 | 12/1992 |

* cited by examiner

*Primary Examiner*—Dirk Wright
(74) *Attorney, Agent, or Firm*—Davis Bujold & Daniels, P.L.L.C.

(57) ABSTRACT

A transmission (1) is proposed, especially an automated power-split multi-speed transmission, comprises at least three power branches (P1, P2, P3), which are each connected to a shaft (2, 3, 4) of a downstream planetary gearset (5) and are configured with at least one partial transmission ratio (i1, i2, i3). Each power branch (P1, P2, P3) comprises a control element (S1, S5, S6) for connecting the power branches (P1, P2, P3) to a power flow of the transmission (1) at a partial transmission ratio (i1, i2, i3). At least one of the shafts (3, 4) of the planetary gearset (5) interacts with an additional control element (S2, S4), via which the shaft (3, 4) can be supported in relation to a housing (6). An additional control element (S3) is arranged between two shafts (3, 4) of the planetary gearset (5) which, in its closed state, blocks the planetary gearset (5).

6 Claims, 3 Drawing Sheets

24

| | S1 | S2 | S3 | S4 | S5 | S6 | i | phi |
|---|---|---|---|---|---|---|---|---|
| "1" | | | | ● | | ● | 6,696 | 1,685 |
| "2" | | | ● | | | ● | 3,973 | 1,527 |
| "3" | | | | | ● | ● | 2,602 | 1,503 |
| "4" | | | ● | | ● | | 1,731 | 1,379 |
| "5" | ● | | | | | ● | 1,256 | 1,256 |
| "6" | ● | | ● | | | | 1,000 | 1,145 |
| "7" | ● | | | | ● | | 0,873 | 1,174 |
| "8" | ● | | | ● | | | 0,744 | |
| "R1" | | ● | | | ● | | -5,023 | 9,004 |

| | S1 | S2 | S3 | S4 | S5 | S6 | i | phi |
|---|---|---|---|---|---|---|---|---|
| "1" | | ● | | | | ● | 9,208 | 1,752 |
| "2" | | | | ● | | ● | 5,255 | 1,655 |
| "3" | | | ● | | | ● | 3,175 | 1,322 |
| "4" | | | | | ● | ● | 2,401 | 1,372 |
| "5" | | | ● | | ● | | 1,750 | 1,337 |
| "6" | ● | | | | | ● | 1,309 | 1,309 |
| "7" | ● | | ● | | | | 1,000 | 1,225 |
| "8" | ● | | | | ● | | 0,816 | 1,246 |
| "9" | ● | | | ● | | | 0,655 | |
| "R1" | | ● | | | ● | | -3,324 | 14,058 |

Fig. 4

# TRANSMISSION, IN PARTICULAR AN AUTOMATED POWER-BRANCHED MULTI-SPEED GEARING

This application is a national stage completion of PCT/EP2004/003274 filed Mar. 27, 2004 which claims priority from German Application Serial No. 103 15 313.6 filed Apr. 4, 2003.

FIELD OF THE INVENTION

The invention relates to a transmission, especially an automated power-split multi-speed transmission, having at least three power branches.

BACKGROUND OF THE INVENTION

Automated manual transmission systems that are primarily based on the principle of conventional manual shift transmissions having a countershaft design are generally known from practice, where shifting is performed with the aid of control elements configured as synchronizing elements, which are characterized by the fact that they require little space. In contrast to this, the power-determining elements of a countershaft transmission, which due to their long life and high efficiency are generally configured as spur gears, require a lot of space, which is often limited the case of passenger vehicles.

Transmission concepts having a substantially more compact design are automatic powershift transmissions with planetary gearsets, which may additionally comprise an internal torque split design. While these transmissions, due to their compact design, require relatively little space, it is disadvantageous with this type of transmission that the control elements, such as friction clutches and friction brakes, have to be dimensioned relatively large and be actuated hydraulically. This results in considerable drag losses and an accordingly high level of actuating energy, which influences the efficiency of the transmission negatively.

Furthermore, transmission types are known from practice which attempt to combine the advantages of the countershaft transmissions with respect to their small control elements and the advantages of the automated powershift transmissions comprising planetary gearsets with respect to their compact gearing in that a downstream planetary gearset is provided in a countershaft transmission, thus creating a range-change transmission with purely geometrical ratios. The problem here is, among other things, that the ratios in lower gears are very small, while they are very large in higher gears, making driving the passenger vehicle more difficult.

A combination of features of the above-described transmission types is disclosed in U.S. Pat. No. 5,013,289 with a transmission comprising a countershaft transmission area and two planetary gearsets. Three power paths are provided between a gear input shaft and an output or arranged coaxially thereto, in which the gear ratio can be changed by way of a power shift. By providing three power paths that may be connected to the planetary gearsets, six forward gears can be implemented with relatively few control elements.

The disadvantage here, however, is that the power shift requires the use of multi-disk clutches, resulting in correspondingly high expenses for the design, the hydraulic control and regulation, and that the space requirement of the transmission has not been optimized with respect to the gears that can be shifted with the transmission.

It is, therefore, the object of the present invention to provide a transmission, especially an automated power-split multi-speed transmission, which has been improved compared to the prior art in that it can have a compact design even with a higher number of shiftable gears and can be implemented in a simple layout with little space requirement and which is characterized by good driving behavior.

SUMMARY OF THE INVENTION

When using the transmission, according to the invention, which is preferably configured to incorporate countershaft and power-split designs and comprises at least three power branches—with at least one control element and at least one partial transmission ratio, respectively—and the planetary gearset, the transmission can be shifted easily and pleasantly, since such a transmission can be implemented with the required gear steps.

Additionally, according to the invention, the combination of the partial transmission ratios arranged in a power branch and the planetary gearset advantageously results in the possibility of implementing the multi-speed transmission with the largest possible number of gear steps, which are, in turn, achieved with the lowest possible amount of transmission components.

This advantageously leads to the fact that the transmission, according to the invention, has smaller outer dimensions compared to conventionally designed multi-speed transmissions and is characterized by a lower overall weight, which consequently results in a better fuel economy when using the multi-speed transmission in a motor vehicle.

Beyond that, it is advantageous that in the case of simple shifts in the multi-speed transmission, essentially only one disclosed control element is closed in each case, and a closed control element is disclosed from the power flow of the transmission, according to the invention, which prevents range shifts that are critical in terms of shifting quality, where several control elements of a transmission have to be actuated simultaneously, nearly completely.

Additionally, compared to the transmissions known from the prior art, the transmission, according to the invention, has the advantage that with the transmission at least one gear or an overall gear ratio can be implemented at which the driving torque can be guided directly through the transmission, i.e. without losses in the gearing of the transmission.

This is accomplished in that an additional control element which, in its closed state blocks the planetary gearset, is arranged between two shafts of the planetary gearset.

Moreover, the arrangement of the additional control element, according to the invention, leads to the fact that compared to transmissions known from the prior art, more gear ratios can be implemented without additional gear wheel steps so that the number of possible shiftable gear steps is optimized with respect to the space requirement of the transmission, according to the invention.

BRIEF DESCRIPTION OF THE DRAWINGS

The invention will now be described, by way of example, with reference to the accompanying drawings in which:

FIG. 3 is a schematic diagram and a gear ratio series for a transmission according to the invention configured as an 8-gear transmission, and FIG. 4 is a schematic diagram and a gear ratio series for a transmission according to the invention configured as a 9-gear transmission.

DETAILED DESCRIPTION OF THE INVENTION

Figure 1:
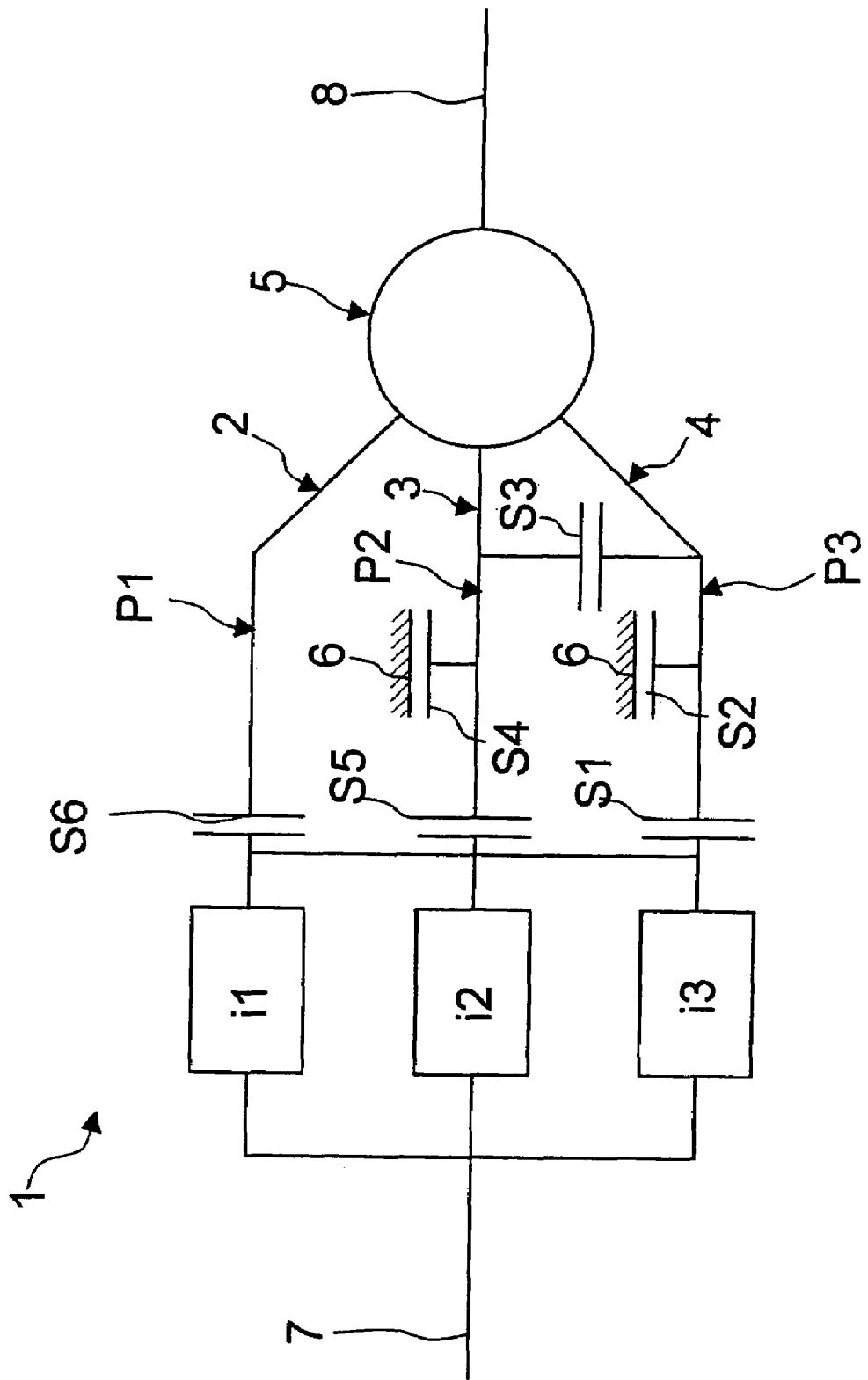
FIG. 1 is a basic diagram of a transmission according to the invention.

In FIG. 1, a basic diagram of a transmission 1 configured as an automated, power-split, multi-speed transmission is shown, which comprises three power branches P1, P2 and P3. The power branches P1 to P3 are connected to a shaft 2, 3, 4 of a planetary gearset 5, respectively. Additionally, each of the power branches P1 to P3 comprises a partial transmission ratio i1, i2 and i3 as well as a control element S6, S5 and S1, respectively. The power branches P1 to P3 can be connected to a power flow of the transmission 1 by way of the control elements S6, S5 and S1.

Additionally, the two shafts 3 and 4 of the planetary gearset 5 can be supported in relation to a housing 6 of the transmission 1 by way of control elements S4 and S2 or can be fixed torsion-resistant in the housing 6 of the transmission 1.

Beyond that a control element S3, which in its closed state blocks the planetary gearset 5, is arranged between the two shafts 3 and 4 of the planetary gearset 5 so that a driving torque applied by a gear input shaft 7 can be guided directly to a gear output shaft 8 at an overall gear ratio of i_ges=1 when the control element S2 is closed and the control element S3 is closed.

With the three specified gear ratios i1, i2 and i3 and the control elements S1 to S6, as illustrated in the diagrams 24 in accordance with FIG. 3 and FIG. 4, advantageously eight or nine gear steps for forward travel can be shifted, which are implemented as progressive ratios for a more comfortable driving experience. A reverse gear can be implemented either through an additional spur gear step with integrated rotational speed reversal or by way of a forced rotational speed reversal in the planetary gearset 5 by switching the control elements S1 to S6 in a suitable fashion.

Figure 2:
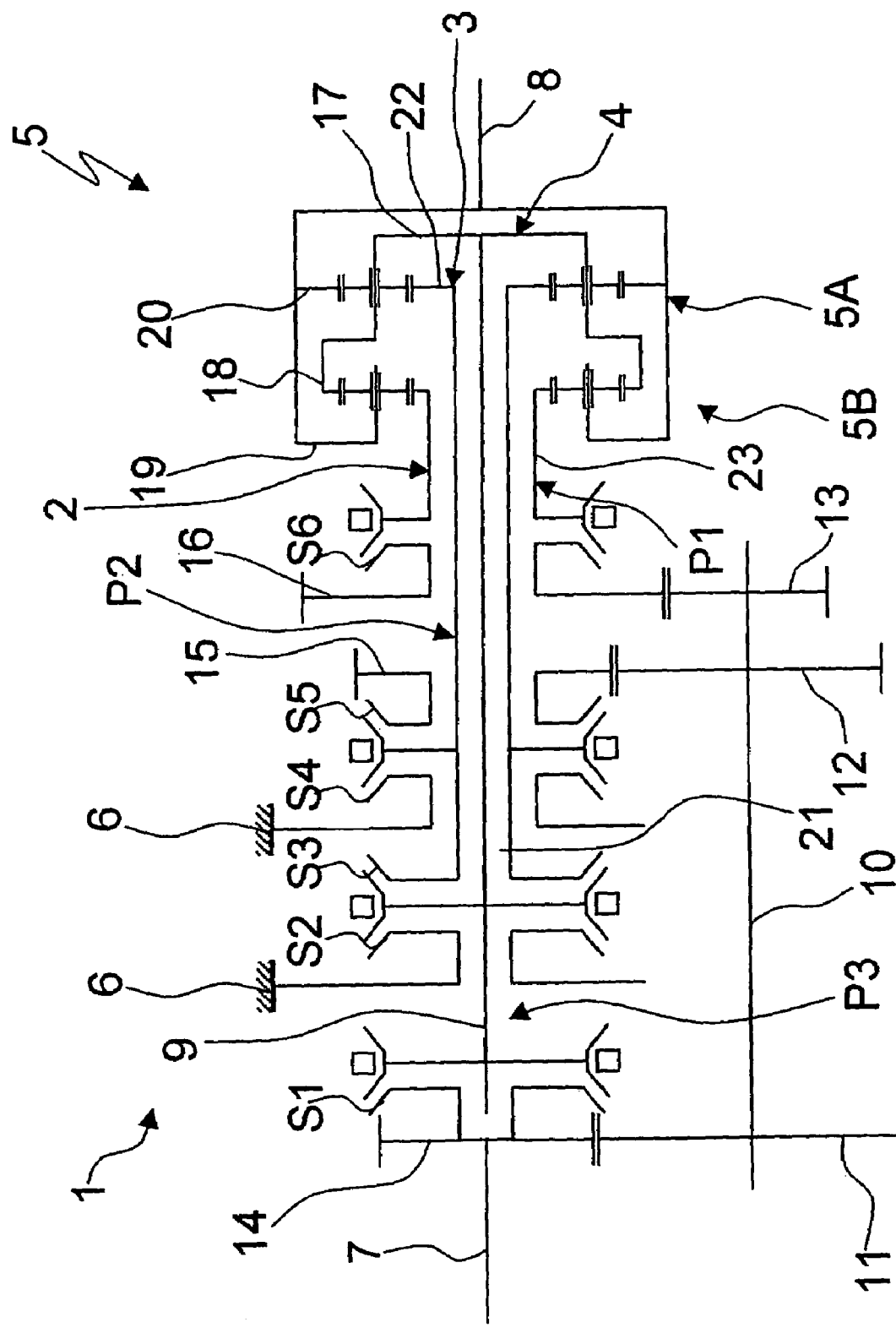
FIG. 2 is a wheel diagram of the transmission illustrated in principle in FIG. 1.

FIG. 2 shows a wheel diagram of the transmission 1, with the transmission 1 comprising a transmission structure configured as a countershaft transmission and the planetary gearset 5 implemented as a summation gear and arranged downstream from the countershaft transmission area. The transmission 1 is equipped with a main shaft 9 in the area of its countershaft transmission, with a countershaft 10 being arranged parallel thereto, on which three spur gears 11, 12, 13 engaging with the spur gears 14, 15 and 16 are arranged.

The spur gear 14 is connected torsion-resistant to the gear input shaft 7 and constantly drives the countershaft 10 during operation of the transmission 1. Moreover the gear input shaft 7 is connected to the main shaft 9 of the transmission 1 in the closed state of the control element S1.

The planetary gearset 5 in the present example is configured as a 4-shaft planetary gearset, which is composed of two minus planetary gearsets 5A and 5B. A planet carrier 17 of the first minus planetary gearset 5A is connected to an internal gear 18 of the second minus planetary gearset 5B. A planet carrier 19 of the second minus planetary gearset 5B is connected to an internal gear 20 of the first minus planetary gearset 5A and the gear output shaft 8.

As an alternative to the latter version of the planetary gearset, in another construction of the transmission, according to the invention, it may also be provided that the planetary gearset is combined from two other planetary gearsets. The planetary gearset may be constructed, e.g., as a Ravigneaux planetary gearset.

The main shaft 9, which is connected to the planet carrier 17 of the first minus planetary gearset 5A, is connected in the closed state of the control element S2 such to the housing 6 of the transmission 1 that the main shaft 9 and hence also the carrier or planet carrier 17 of the first minus planetary gearset 5A are arranged torsion-resistant in the housing 6.

In the closed state of the control element S3, the main shaft 9 is connected, via a hollow shaft 21, to a sun gear 22 of the first minus planetary gearset 5A so that the sun gear 22 and the carrier 17 of the first minus planetary gearset 5A are connected non-ratably to each other, and the planetary gearset 5 is blocked and revolves as a rigid unit.

In the closed state of the control element S4, the hollow shaft 21, and hence the sun gear 22 of the first minus planetary gearset 5A, are connected fast to the housing 6, with the gear ratio formed by the mutually engaging spur gears 12 and 15 being connected to the power flow of the transmission 1 when the control element S5 is closed.

By way of the control element S6, another spur gear ratio, which is formed by the mutually engaging spur gears 13 and 16, is connected to the power flow of the transmission 1. This means that in the closed state of the control element S6, the driving torque applied by the countershaft 10 is directed on a sun gear 23 of the second minus planetary gearset 5B.

With appropriate actuation of the control elements S1 to S6 gear, input torque is directed to one of the power branches P1, P2 or P3 or, at the same time, via two of the three power branches P1 to P3 when the power-split mechanism is activated. Each of the power branches P1 to P3 is connected to a power flow of the transmission 1, as needed, or disconnected therefrom with the aid of the associated control element S6, S5 or S1 at its partial transmission ratio i1, i2 or i3.

The power paths P1 to P3 which, in the present example, are provided with a partial transmission ratio, may also be configured with transmission structures that have more than one partial transmission ratio in another embodiment of the invention.

When using the above-described embodiment of the transmission combined with the switching logic explained hereinafter, many gear steps or overall gear ratios of the transmission 1 can be implemented while, at the same time, keeping the number of gear ratio steps low, thus providing a very beneficial transmission concept in terms of space.

FIG. 3 and FIG. 4 illustrate schematic diagrams 24 reflecting the correlation between the individual gears for forward travel "1" to "8" or "1" to "9" and a reverse gear "R1" of the transmission 1 from FIG. 1 and the shifting states of the control elements S1 to S6.

The schematic diagrams 24 are prepared in the form of tables, the left-hand column of which list the individual gears "1" to "8" or "1" to "9" and "R1"transmission 1. The top lines of the schematic diagrams 24 list the individual control elements S1 to S6, an overall gear ratio i_ges of the transmission 1 and a progressive ratio phi, which is formed from the quotient of the values of two successive overall gear ratios.

The schematic diagram 24 in FIG. 3 in conjunction with the basic diagram of the transmission 1 illustrated in FIG. 1 shows, for example, that the control elements S4 and S6 are closed or connected for shifting the first gear "1" or the first overall gear ratio i_ges of the transmission 1. In this operating mode of the transmission, a driving torque is directed from the gear input shaft 7, via the spur gears 14 and 11, to the countershaft 10 and, via the spur gears 13 and 16, to the sun gear 23 of the second minus planetary gearset 5B. Thereafter it is forwarded to the gear output shaft 8.

In this state of the transmission 1, the driving torque of the gear input shaft 7 is directed to the planetary gearset 5, via the power branch P1 illustrated in FIG. 1, since the power branch P1 is connected to the power path of the transmission 1, via the closed control element S6. At the same time, the shaft 3, which in FIG. 2 is the sun gear 23 of the second minus planetary gearset 5B, is connected torsion-resistant to the housing 6.

In the present case, the partial transmission ratio i1 of the power branch P1 is formed by the mutually engaging spur gears 14 and 11 at a partial transmission ratio ik and a gear ratio of the spur gears 16 and 13. The overall gear ratio i_ges in the first gear "1" of the transmission 1 has a value of 6.696 due to the sun gear 23 of the second minus planetary gearset 5B, the sun gear being held torsion-resistant by the closed control element S4 and the developing gear ratio in the planetary gearset 5.

During an upshift, starting from gear "1" into gear "2" of the transmission 1, the control element S6 remains closed and the control element S3 is connected while, at the same time, the control element S4 is disconnected or disclosed. Connecting the control element S3 causes the planetary gearset 5 to become blocked or locked so that the elements of the planetary gearset can no longer rotate in relation to each other and the planetary gearset 5 revolves as a unit in the housing 6 nearly loss-free with the exception of the bearing losses.

In the closed state of the control element S3, the shaft 3 and the shaft 4 of the transmission 1, which in FIG. 2 are the sun gear 22 of the first minus planetary gearset 5A connected to the hollow shaft 21 and the planet carrier 17 of the second minus planetary gearset 5B connected to the main shaft 9, are connected to each other. The driving torque of the gear input shaft 7 is applied to the countershaft 10, via the spur gears 14 and 11, at the gear ratio ik when the control element S1 is closed and is then applied directly to the gear output shaft 8, via the spur gears 13 and 16 and the blocked planetary gearset 5, due to the closed control element S6.

The partial transmission ratio i1 of the connected power branch P1, in turn, is formed from the gear ratio ik and the gear ratio between the spur gears 13 and 16, leading to an overall gear ratio i_ges of 3.973 due to the blocked planetary gearset 5. This results in a progressive ratio phi of 1.685 between the first gear "1" and the second gear "2" of the transmission 1.

To shift the reverse gear "R1", the control element S2 and the control element S5 are closed simultaneously, as illustrated in the schematic diagram 24 in accordance with FIG. 3 and FIG. 4, thus directing the driving torque via the power branch P2 through the transmission 1 in the direction of the gear output shaft 8 and, on the other hand, achieving a rotational direction reversal in the planetary gearset 5 to implement the reverse gear "R1".

During an upshift, starting from gear "2" into gear "3" of the transmission 1, the control element S6, in turn, remains closed and the control element S5 is connected to the power flow of the transmission 1. At the same time, the control element S3 is disconnected. This way the driving torque of the gear input shaft 7 is directed through the transmission 1, via the two power branches P1 and P2 at their partial transmission ratios i1 and i2, with the split driving torque being added up in the planetary gearset 5 and subsequently forwarded to the gear output shaft 8.

In this operating state of the transmission 1, the gear input torque is directed via the spur gears 14 and 11 at the gear ratio ik to the countershaft and from there via the spur gears 12 and 15 and their gear ratio to the sun gear 22 of the first minus planetary gearset 5A. At the same time, part of the driving torque is directed from the countershaft 10, via the spur gears 13 and 16 and their gear ratios, to the sun gear 23 of the second planetary gearset 5B. In the planetary gearset 5 the two parts of the driving torque are added up and forwarded to the gear output shaft 8.

The partial transmission ratio i2 of the connected power branch P2 is formed from the gear ratio ik and the gear ratio resulting from the ratio of the number of teeth of the spur gears 12 and 15. The partial transmission ratio i1 of the power branch P1 is composed of the gear ratio ik and the gear ratio between the spur gears 14 and 11. This state of the transmission 1 results in an overall gear ratio i_ges of 2.602 of the gear "3". The progressive ratio phi between the second gear "2" and the third gear "3" of the transmission 1 is 1.527.

During a further upshift from the third gear "3" to the fourth gear "4", the control element S6 is disconnected and the control element S3 is closed so that the gear input torque is directed, via the power branch S2 and the blocked planetary gearset 5, to the gear output shaft 8 causing, on one hand, no torque split to exist in the transmission 1 and, secondly, avoiding power loss in the planetary gearset 5 due to the direct transmission of the gear input torque at the partial transmission ratio i2, which then also simultaneously represents the overall gear ratio i_ges.

When the fifth gear "5" has been closed in the transmission 1, the control element S1 and the control element S6 are closed so that the gear input torque is directed, via the power paths P1 and P3, across a power split through the transmission 1 and directed in the summated state in the planetary gearset 6 (which is not blocked in this case) to the gear output shaft 8.

In order to implement the sixth gear "6" in the transmission 1, the control element S1 and, at the same time, the control element S3 are closed so that a gear input torque of the gear input shaft 7 is directed by way of the control element S1, via the power branch P3, to the shaft 4 of the planetary gearset 5. The closed control element S3, in turn, causes the planetary gearset 5 to be blocked and the gear input torque to be directed from the gear input shaft 7 directly, i.e., at an overall gear ratio i_ges equal 1.0, and nearly free of losses through the transmission 1 to the gear output shaft 8. Consequently, the partial transmission ratio i3 of the power branch P3 has a value of 1 in the present case.

Compared to familiar transmissions from the prior art, the above-described shifting logic and the associated alternating conduction of the driving torque, via one or simultaneously via two of the three power branches at the different partial transmission ratios in combination with the additional control element for blocking the planetary gearset 5, leads to the fact that the same number of gear steps can be implemented with fewer wheel planes. Thus the transmission, according to the invention, has significantly smaller outer dimensions; consequently, a lower overall weight and, moreover, considerably lower manufacturing costs at the same power capacity.

Moreover, compared to the standard transmissions known from the prior art, according to the invention, the transmission is characterized by higher efficiency since the driving torque is transmitted with several gear steps of the transmission directly through the transmission, i.e., with a blocked planetary gearset 5, to the gear output shaft 8.

Additionally, the progressive ratio of the individual overall gear ratios of the transmission 1 offers a better possibility to adjust the available torque to the required torque than is the case with geometrically stepped transmissions since conventional range-change transmissions generally have equally large gear transitions due to their geometrically stepped design.

The control elements S1 to S6 of the transmission 1 are configured in the present case as familiar synchronizing devices, which are provided with a friction clutch or brake component to compensate for rotational speed differences in the transmission. After the synchronizing step, the components of the power branches or of the transmission 1, which are connected to each other torsion-resistant, are positively coupled by way of a positive fitting clutch or brake component of the control elements S1 to S6.

Alternatively in another advantageous embodiment of the transmission, according to the invention, it may also be provided that the control elements S1 to S6 are configured as friction control elements, such as multi-plate clutches or multi-plate brakes; the transmission 1 then being configured as a powershift transmission with which up- and downshifts can be performed under load, i.e., without interruption of the torque flow.

The control elements can be arranged in front of or behind the respective gear step which, in the present case, is configured as a spur gear step and is connected or disconnected via the control elements. The closer the control elements are positioned to the gear steps that are supposed to be connected, the smaller the rotating mass of the transmission components involved in the shift that needs to be synchronized by the control elements.

Additionally, in another advantageous further development of the transmission, according to the invention, it can be provided that a driving element is provided in a powertrain of a vehicle or motor vehicle, the driving element being one of the control elements of the transmission configured as power shift elements or a separate component, such as a hydrodynamic torque converter, a dry clutch or an electric motor that is actively connected to an arbitrary shaft of the multi-speed transmission.

Especially when the driving element is separately configured as an electric motor, a driving torque that is required to start moving is either generated by the electric motor or a driving torque applied by a driving machine is supported by the electric motor such that, at the output of the vehicle, the driving torque required to start moving is applied.

If the three power paths P1 to P3 are configured with three transmission structures having several transmission structure ratios and being implemented in any of the power branches P1 to P3 instead of with the partial transmission ratios i1 to i3, the number of gears that can be implemented with the transmission 1 can be increased significantly. The transmission structure ratios in the individual transmission structures can be prepared and closed without load before connecting the respective power branch so that the shift of the various transmission structure gear ratios in the transmission structures can be performed with positive fitting control elements, which are inexpensive and space-saving.

Connecting the power branches to the power flow of the transmission, according to the invention, can independently advantageously be accomplished with power-shift friction control elements, such as multi-plate clutches, under load without interrupting the torque flow.

As an alternative to the embodiment of the inventive transmission illustrated in FIG. 2, the countershaft area of the transmission may be configured with at least two equal countershafts arranged parallel to the main shaft in the housing, allowing the transmission to be designed even smaller, lighter and at a lower cost.

REFERENCE NUMERALS 1 transmission
2-4 shafts of the planetary gearset
5 planetary gearset
5a first minus planetary gearset
5b second minus planetary gearset
6 transmission housing
7 gear input shaft
8 gear output shaft
9 main shaft
10 countershaft
11-16 spur gears
17 planet carrier of the first minus planetary gearset
18 internal gear of the second minus planetary gearset
19 planet carrier of the second minus planetary gearset
20 internal gear of the first minus planetary gearset
21 hollow shaft
22 sun gear of the first minus planetary gearset
23 sun gear of the second minus planetary gearset
24 schematic diagram
P1-P3 power branch
i1, i2,
i3, ik partial transmission ratio
S1-S6 control element

The invention claimed is:

1. An automated power-split multi-speed transmission (1), comprising: at least first, second and third power branches (P1, P2, P3), the first power branch (P1) is connected to a first shaft (2), the second power branch (P2) is connected to a second shaft (3) and the third power branch (P3) is connected to a third shaft (4), and the first, the second and the third shafts (2, 3, 4) communicate with a downstream planetary gearset (5), the first shaft (2) having at least a first partial transmission ratio (i1), the second shaft (3) having at least a second partial transmission ratio (i2) and the third shaft (4) having at least a third partial transmission ratio (i3), the first power branch (P1) having a first control element (S6) for connecting the first power branch (P1) to a power flow at the first partial transmission ratio (i1), the second power branch (P2) having a second control element (S5) for connecting the second power branch (P2) to a power flow at the second partial transmission ratio (i2), and the third power branch (P3) having a third control element (S1) for connecting the third power branch (P1) to a power flow at the first partial transmission ratio (i3), at least one of the second and the third shafts (3, 4) of the planetary gearset (5) interacting with an additional control element (S2, S4), via which the at least one of the second and the third shafts (3, 4) can be connected to a housing, (6) and a third additional control element (S3) being arranged between the second and the third shafts (3, 4) of the planetary gearset (5), the third additional control element (S3), in an engaged state, blocks the planetary gearset (5), and the transmission (1) having eight forward gears.

2. An automated power-split multi-speed transmission (1), comprising at least first, second and third power branches (P1, P2, P3), the first power branch (P1) being connected to a first shaft (2), the second power branch (P2) being connected to a second shaft (3) and the third power branch (P3) being connected to a third shaft (4), and the first, the second and the third shafts (2, 3, 4) communicate with a downstream planetary gearset (5), the first shaft (2) having at least a first partial transmission ratio (i1), the second shaft (3) having at least a second partial transmission ratio (i2) and the third shaft (4) having at least a third partial transmission ratio (i3), the first power branch (P1) having a first control element (S6) for connecting the first power branch (P1) to a power flow at the first partial transmission ratio (i1), the second power branch (P2) having a second control element (S5) for connecting the second power branch (P2) to a power flow at the second partial transmission ratio (i2), and the third power branch (P3) having a third control element (S1) for connecting the third power branch (P1) to a power flow at the first partial transmission ratio (i3), and at least one of the second and the third shafts (3, 4) of the planetary gearset (5) interacting with an additional control element (S2, S4), via which the at least one of the second and the third shafts (3, 4) can be connected to a housing (6) and a third additional control element (S3), being arranged between the second and the third shafts (3,4) of the planetary gearset (5), the third additional control element (S3), in an engaged state, blocks the planetary gearset (5) and the transmission (1) having nine forward gears.

3. The transmission according to claim 1, wherein
the third control element (S1) is provided in the third power branch (P3);
the second control element (S5) is provided in the second power branch (P2);
the first control element (S6) is provided in the first power branch (P1);
the third shaft (4) of the planetary gearset (5) is connectable to the housing (6) by a first additional control element (S2);
the second shaft (3) of the planetary gearset (5) is connectable to the housing by a second additional control element (S4); and the third additional control element (S3) is provided between the second and the third shafts (3, 4) of the planetary gearset (5).

4. The transmission according to claim 1, wherein for engaging a first forward gear, a second additional and the first control elements (S4, S6) are engaged; for engaging a second forward gear, the third additional and the first control elements (S3, S6) are engaged; for engaging a third forward gear, the second and the first control elements (S5, S6) are engaging; for engaging the fourth forward gear, the third additional and the second control elements (S3, S5) are engaged; for engaging a fifth forward gear, the third and the first control elements (S1, S6) are engaged; for engaging a sixth forward gear, the third control element (S1) and the third additional control element (S3) are engaged; for engaging a seventh forward gear, the third and the second control elements (S1, S5) are engaged; and for engaging an eighth forward gear, the third control element (S1) and the second additional control element (S4) are engaged.

5. The transmission according to claim 2, wherein for engaging a first forward gear, a first additional and the first control elements (S2, S6) are engaged for engaging a second forward gear, a second additional and the first control elements (S4, S6) are engaged; for engaging a third forward gear, the third additional and the first control elements (S3, S6) are engaged; for engaging a fourth forward gear, the second and the first control elements (S5, S6) are engaged; for engaging a fifth forward gear, the third additional and the second control elements (S3, S5) are engaged; for engaging a sixth forward gear, the third and the first control elements (S1, 56) are engaged; for engaging a seventh forward gear, the third control element (S1) and the third additional control element (S1, S3) are engaged; for engaging an eighth forward gear, the third and the second control elements (S1, S5) are engaged; and for engaging a ninth forward gear, the third control element (S1) and the second additional control element (S1, S4) are engaged.

6. The transmission according to claim 1, wherein for engaging a reverse gear the first additional and the second control elements (S2, S5) are engaged.

* * * * *